United States Patent [19]
Watanabe et al.

[11] Patent Number: 5,500,774
[45] Date of Patent: Mar. 19, 1996

[54] CURRENT SETTING CIRCUIT TO PROVIDE A WRITE CURRENT TO A RECORDING APPARATUS

[75] Inventors: Shinichi Watanabe; Norio Shoji, both of Kanagawa; Michiya Sako, Kagoshima, all of Japan

[73] Assignee: Sony Corporation, Tokyo, Japan

[21] Appl. No.: 253,697

[22] Filed: Jun. 3, 1994

[30] Foreign Application Priority Data

Jun. 8, 1993 [JP] Japan ................................ 5-137861

[51] Int. Cl.⁶ .............................. G11B 5/09; G11B 15/12
[52] U.S. Cl. .................... 360/46; 327/538; 360/61
[58] Field of Search ........................ 360/46, 61, 67, 360/68, 31, 45, 48; 327/538, 540, 545

[56] References Cited

U.S. PATENT DOCUMENTS

| | | | |
|---|---|---|---|
| 4,327,383 | 4/1982 | Holt | 360/45 |
| 4,432,025 | 2/1984 | Grogan | 360/48 |
| 4,821,125 | 4/1989 | Christensen et al. | 360/31 |
| 5,216,553 | 6/1993 | Nakamura | 360/46 |

*Primary Examiner*—Andrew L. Sniezek
*Assistant Examiner*—Patrick Wamsley
*Attorney, Agent, or Firm*—Ronald P. Kananen

[57] ABSTRACT

A write current setting circuit of a magnetic recording apparatus which can be reduced in the number of IC pins and enables the increase of the IC pins accompanying an increase in the number of modes to be kept to a minimum. The external resistance elements for generating the sub-mode correction current are connected to a single IC pin. The IC is provided with a current generation circuit and a voltage follower for holding the output voltage at a predetermined value and is provided with a sub-mode switch circuit for switching the connection between the IC pin and the internal power source line and output terminal of the voltage follower in accordance with the input of a correction current control signal. Due to this, while six external resistance elements are required, (2×n) modes can be set by (n+1) IC pins of the integrated circuit.

7 Claims, 2 Drawing Sheets

CURRENT SETTING CIRCUIT TO PROVIDE A WRITE CURRENT TO A RECORDING APPARATUS

BACKGROUND OF THE INVENTION

1. Field of the Invention

The present invention relates to a circuit for setting the write current of a magnetic disk apparatus, floppy disk apparatus, or other magnetic recording apparatus.

2. Description of the Related Art

In a magnetic recording apparatus, a write current is applied to a magnetic head to generate a magnetic field and thereby write data on a magnetic recording medium.

This write current is changed depending on a main operating mode of the magnetic recording apparatus. In a write current setting circuit, connections between the internal reference power source of the IC and external resistance elements provided corresponding to the different modes are switched so as to set the current to a value suitable to the mode. This enables a write current tailored to the mode to be generated and supplied to the magnetic head.

Sometimes, further, each main mode is provided with a sub-mode for complementing the mode. In this case, external resistance elements are provided corresponding to each main mode so as to correct the write current when the sub-modes are added. For example, in the case of a write current setting circuit of a 4 MB mode floppy disk drive (hereinafter referred to as an "FDD"), there are a total of six modes: three main modes, that is, 1 MB mode, 2 MB mode, and 4 MB mode, and two sub-modes for switching the current at the inner and outer circumference sides of the disk in each main mode.

FIG. 1 is a circuit diagram of an example of the configuration of a conventional write current setting circuit of an FDD. In FIG. 1, IC represents an integrated circuit, $T_1$ to $T_9$ IC pins, $V_{ref}$ an internal reference power source, $AMP_1$ an amplifier, $SW_1$ to $SW_3$ main mode switch circuits, $SW_{C1}$ to $SW_{C3}$ sub-mode switch circuits, $SW_{HD}$ a head switch circuit, $Q_1$, and $Q_2$ npn type transistors, $r_1$, and $r_2$ internal resistance elements, $R_1$ to $R_3$ and $R_{C1}$ to $R_{C3}$ external resistance elements, $V_{cc}$ an external power source, $V'_{cc}$ an internal power source line, and MHD a magnetic head.

In this write current setting circuit, the 1 MB mode terminal is comprised by the IC pin $T_1$ of the integrated circuit IC, the 2 MB mode terminal by the IC pin $T_2$, and the 4 MB mode terminal by the IC pin $T_3$.

The inner/outer circumference current switching terminal in the case of 1 MB mode is comprised by the IC pin $T_4$, the inner/outer circumference current switching terminal in the case of 2 MB mode is comprised by the IC pin $T_5$, and the inner/outer circumference current switching terminal in the case of 4 MB mode is comprised by the IC pin $T_6$.

In the integrated circuit, the IC pin $T_1$ is connected to one terminal of the switch circuit $SW_1$ and the other terminal of the switch circuit $SW_1$ is connected to the collector of the transistor $Q_1$ and the non-inverted input terminal of the amplifier $AMP_1$.

The IC pin $T_2$ is connected to one terminal of the switch circuit $SW_2$, and the other terminal of the switch circuit $SW_2$ is connected to the collector of the transistor $Q_1$ and the non-inverted input terminal of the amplifier $AMP_1$.

The IC pin $T_3$ is connected to one terminal of the switch circuit $SW_3$, and the other terminal of the switch circuit $SW_3$ is connected to the collector of the transistor $Q_1$ and the non-inverted input terminal of the amplifier $AMP_1$.

The IC pin $T_4$ is connected to one terminal of the switch circuit $SW_{C1}$, and the other terminal of the switch circuit $SW_{C1}$ is connected to the internal reference power source $V_{ref}$ and the IC pin $T_9$.

The IC pin $T_5$ is connected to one terminal of the switch circuit $SW_{C2}$, and the other terminal of the switch circuit $SW_{C2}$ is connected to the internal reference power source $V_{ref}$ and the IC pin $T_9$.

The IC pin $T_6$ is connected to one terminal of the switch circuit $SW_{C3}$, and the other terminal of the switch circuit $SW_{C3}$ is connected to the internal reference power source $V_{ref}$ and the IC pin $T_9$.

The internal reference power source $V_{ref}$ is connected to the inverted input terminal of the amplifier $AMP_1$, while the output of the amplifier $AMP_1$ is connected to the bases of the transistors $Q_1$ and $Q_2$.

The emitters of the transistors $Q_1$ and $Q_2$ are grounded through the resistance elements $r_1$ and $r_2$.

The collector of the transistor $Q_2$ is connected to the terminal c of the switch circuit $SW_{HD}$, the terminal a of the switch circuit $SW_{HD}$ is connected to the IC pin $T_7$, and the terminal b is connected to the IC pin $T_8$.

At the outside of the integrated circuit IC, one of the ends of each of the external resistance elements $R_1$, $R_2$, and $R_3$ is connected to the external power source $V_{cc}$, the terminal $T_9$, and the magnetic head MHD.

The other end of the resistance element $R_1$ is connected to the IC pin $T_1$. At a point on the connection between the two and the IC pin $T_4$ is connected an external resistance element $R_{C1}$.

The other end of the resistance element $R_2$ is connected to the IC pin $T_2$. At a point on the connection between the two and the IC pin $T_5$ is connected an external resistance element $R_{C2}$.

The other end of the resistance element $R_3$ is connected to the IC pin $T_3$. At a point on the connection between the two and the IC pin $T_6$ is connected an external resistance element $R_{C3}$.

The two terminals of the magnetic head MHD are connected to the IC pins $T_7$ and $T_8$, respectively.

The main mode switch circuit $SW_1$ is turned ON/OFF in accordance with the input of a main mode control signal CM1, main mode switch circuit $SW_2$ is turned ON/OFF in accordance with the input of a main mode control signal CM2, and the main mode switch circuit $SW_3$ is turned ON/OFF in accordance with the input of a main mode control signal CM3.

The sub-mode switch circuits $SW_{C1}$ to $SW_{C3}$ are turned ON/OFF in accordance with the input of the correction current control signal CC for controlling the sub-mode.

The head switch circuit $SW_{HD}$ switches the connection of the terminal c with the terminals a and b in accordance with the rising edge and falling edge of the pulselike write data. Due to this, the direction of supply of the write current $I_W$ to the magnetic head MHD is changed.

With such a configuration, when writing data at the inner circumference side of the disk in the 1 MB mode, for example, only the main mode control signal CM1 among the main mode control signals CM1 to CM3 is input to the switch circuit $SW_1$ in the active state. As a result, the switch circuit $SW_1$ is held in the ON state, and the switch circuits $SW_2$ and $SW_3$ are held in the OFF state.

Further, when writing data at the inner circumference side of the disk, avoidance of interference between adjoining data requires that the writing be performed with a current smaller than that at the outer circumference side, so no correction of the current in the sub-mode is performed. Accordingly, the correction current control signal CC is input to the sub-mode switch circuits $SW_{C1}$ to $SW_{C3}$ in the non-active state, and the switch circuits $SW_{C1}$ to $SW_{C3}$ are held in the off state. As a result, the internal reference voltage $V_{REF}$ of the internal reference power source $V_{ref}$ is applied to the external resistance element $R_1$, and the write current $I_{WI}$ at that time is given by the following equation:

$$I_{WI} = V_{REF}/R_{1V}$$

where $R_{1V}$ is the resistance value of the resistance element $R_1$.

On the other hand, when recording data at the outer circumference side of the disk in the 1MB mode, there is little danger of interference between data even if writing deeply, so the correction current $I_{WC}$ is added to the write current $I_{WI}$ at the time of writing at the inner circumference side mentioned above and therefore data is written by a current larger than the write current at the inner circumference side. That is, a correction current control signal CC is input to the sub-mode switch circuits $SW_{C1}$ to $SW_{C3}$ in the active state, and the switch circuits $SW_{C1}$ to $SW_{C3}$ are held in the on state. As a result, the internal reference voltage $V_{REF}$ is applied not only to the external resistance element $R_1$, but also the resistance element $R_{C1}$, and the write current $I_{WO}$ at this time becomes the combined current of the current due to the resistance element $R_1$ and the current due to the resistance element $R_{C1}$ as shown in the following equation:

$$I_{WO} = (V_{REF}/R_{1V}) + \{(V_{REF})/R_{C1V}\}$$

where $R_{C1V}$ is the resistance value of the resistance element $R_{C1}$.

However, in the above-mentioned circuit, a total of six external resistance elements $R_1$ to $R_3$ and $R_{C1}$ to $R_{C3}$ and six IC pins $T_1$ to $T_6$ is necessary. The same number of IC pins is required as the external resistance elements, so there is the problem that this led to a larger size of the IC package.

When further increasing the number of main modes in the future, if the number of modes is M and the number of correction sub-modes at each mode is C, then the number of IC pins becomes (M×C) and therefore the number of pins increases tremendously.

SUMMARY OF THE INVENTION

An object of the present invention is to reduce the number of terminals for controlling the IC amplifier and so forth.

Another object of the present invention is to provide a write current setting circuit of a magnetic recording apparatus which is able to keep to a minimum the increase in terminals accompanying an increase in the number of modes.

To achieve the above-mentioned objects, the present invention provides a write current setting circuit of a magnetic recording apparatus which has a plurality of main modes and at least one sub-mode for correction of these main modes and which switches the connection between an internal reference power source provided in the integrated circuit and a plurality of external resistance elements so as to set the write current in accordance with the individual modes and supply the same to a magnetic head, which circuit is provided with a plurality of main mode terminals provided in the integrated circuit corresponding to the above-mentioned main modes, a sub-mode terminal provided in the integrated circuit, a plurality of main mode external resistance elements connected to each of the main mode terminals, a plurality of sub-mode external resistance elements connected between a connection point between the main mode terminals and the main mode resistance elements and the sub-mode terminal, a main mode switch circuit for selectively switching the connection of the internal reference power source with the main mode external resistance elements in accordance with an input of a main mode control signal, a reference voltage level holding circuit for holding the output at a reference voltage level of the internal reference power source, and a sub-mode switch circuit for selectively switching the connection of the sub-mode terminal between the internal power source line and the output terminal of the above reference voltage level holding circuit in accordance with the input of the sub-mode control signal and supplies a write current to a magnetic head through said main mode switch circuit.

According to the present invention, the main mode external resistance elements connected to a single main mode terminal are connected to the internal power source line through the terminal by a main mode switch circuit in accordance with the state of input of the main mode control signal so that the reference voltage of the internal reference power source is applied to the selectively connected main mode external resistance elements. By this, a main current comprised of the internal reference voltage divided by the resistance value of the main mode external resistance elements is produced as the write current.

At this time, when the sub-mode is not made to function, a sub-mode control signal is input to the sub-mode switch circuit in the non-active state, for example, and the sub-mode terminal is connected to the output terminal of the reference voltage holding circuit.

As a result, the connection point between the selectively connected main mode external resistance elements and main mode terminal and the sub-mode terminal become the same in level, and the production of a correction current by the sub-mode external resistance element connected between the connection point and the sub-mode terminal is suppressed.

Consequently, when the sub-mode is not made to function, only the main current comprised of the internal reference voltage divided by the resistance value of the selectively connected main mode external resistance elements is supplied through the main mode switch circuit to the magnetic head.

As opposed to this, when the sub-mode is made to function, a sub-mode control signal is input to the sub-mode switch circuit in the active state for example, and the sub-mode terminal is connected to the internal power source line.

As a result, a correction current comprised of the internal reference voltage divided by the resistance value of the sub-mode external resistance element connected between a connection point between a selectively connected main mode external resistance elements and main mode terminal and the sub-mode terminal is produced and added to the above-mentioned main current.

Accordingly, when the sub-mode is made to function, a current obtained by adding the correction current to the main current is supplied through the main mode switch circuit to the magnetic head as a write current.

BRIEF DESCRIPTION OF THE DRAWINGS

These and other objects and features of the present invention will become clearer from the following description of a preferred embodiment given with reference to the accompanying drawings, wherein.

DESCRIPTION OF THE PREFERRED EMBODIMENTS

Below, a more detailed explanation will be given of an embodiment of the present invention.

Figure 2:
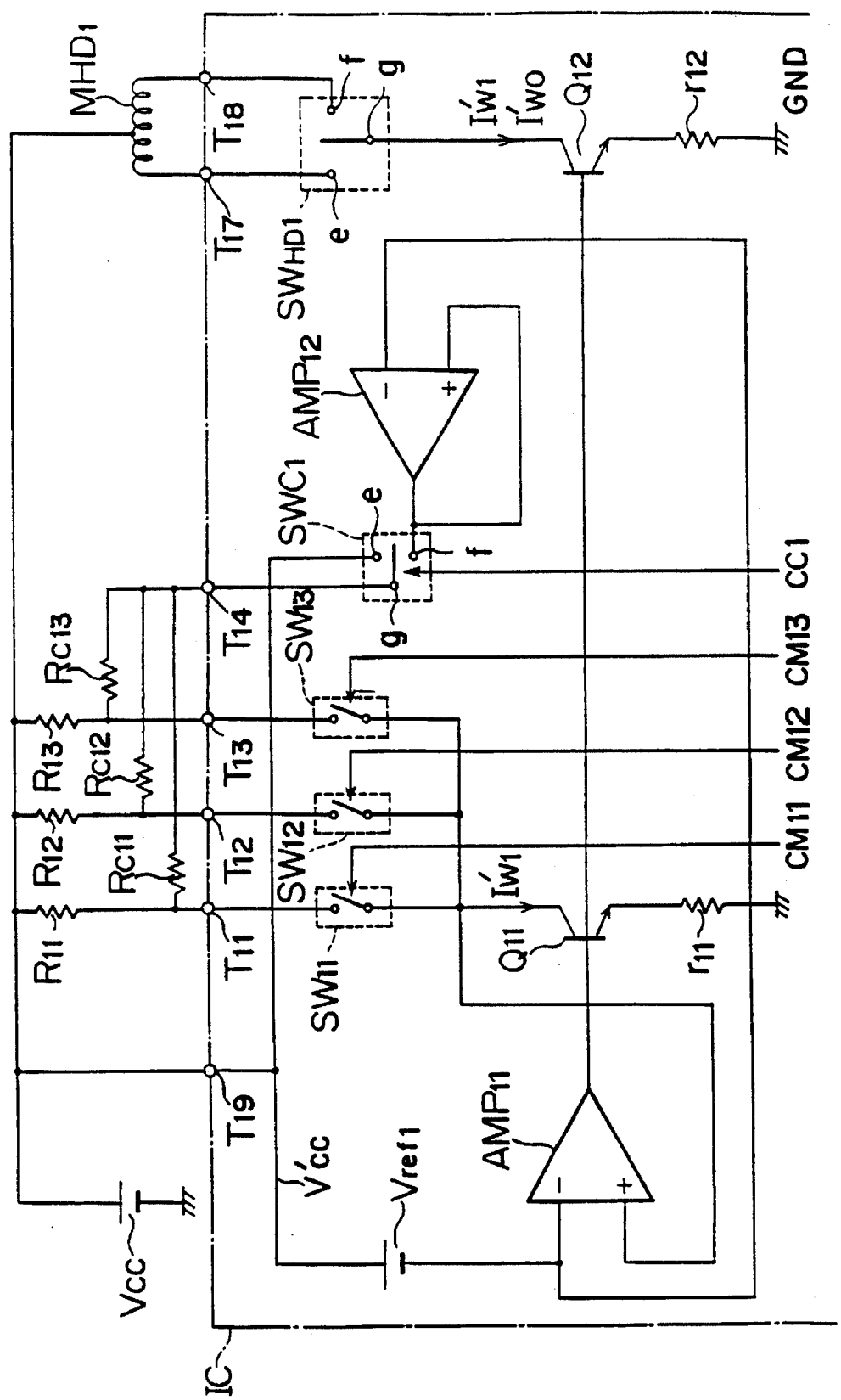
FIG. 2 is a circuit diagram of an example of a write current setting circuit of an FDD according to the present invention.

FIG. 2 is a circuit diagram of an example of a write current setting circuit of an FDD according to the present invention.

In FIG. 2, IC represents an integrated circuit, $T_{11}$ to $T_{14}$ and $T_{17}$ to $T_{19}$ IC pins, $V_{ref1}$ an internal reference power source, $AMP_{11}$ and $AMP_{12}$ amplifiers, $SW_{11}$ to $SW_{13}$ main mode switch circuits, $SW_{C1}$ a sub-mode switch circuit, $SW_{HD1}$ a head switch circuit, $Q_{11}$ and $Q_{12}$ npn type transistors, $r_{11}$ and $r_{12}$ internal resistance elements, $R_{11}$ to $R_{13}$ and $R_{C11}$ to $R_{c13}$ external resistance elements, $V_{cc}$ an external power source, $V'_{cc}$ an internal power source line, and $MHD_1$ a magnetic head.

In this write current setting circuit, the 1 MB mode terminal is comprised by the IC pin $T_{11}$ of the integrated circuit IC, the 2 MB mode terminal by the IC pin $T_{12}$, and the 4 MB mode terminal by the IC pin $T_{13}$. The IC pin $T_{14}$ is comprised so as to share the inner/outer circumference current switching terminal used for the sub-mode in the case of 1 MB mode, 2 MB mode, and 4 MB mode. Accordingly, at the outside of the integrated circuit IC, the other ends of the external resistance elements $R_{C11}$ to $R_{C13}$ are all connected to the IC pin $T_{14}$.

Figure 1:
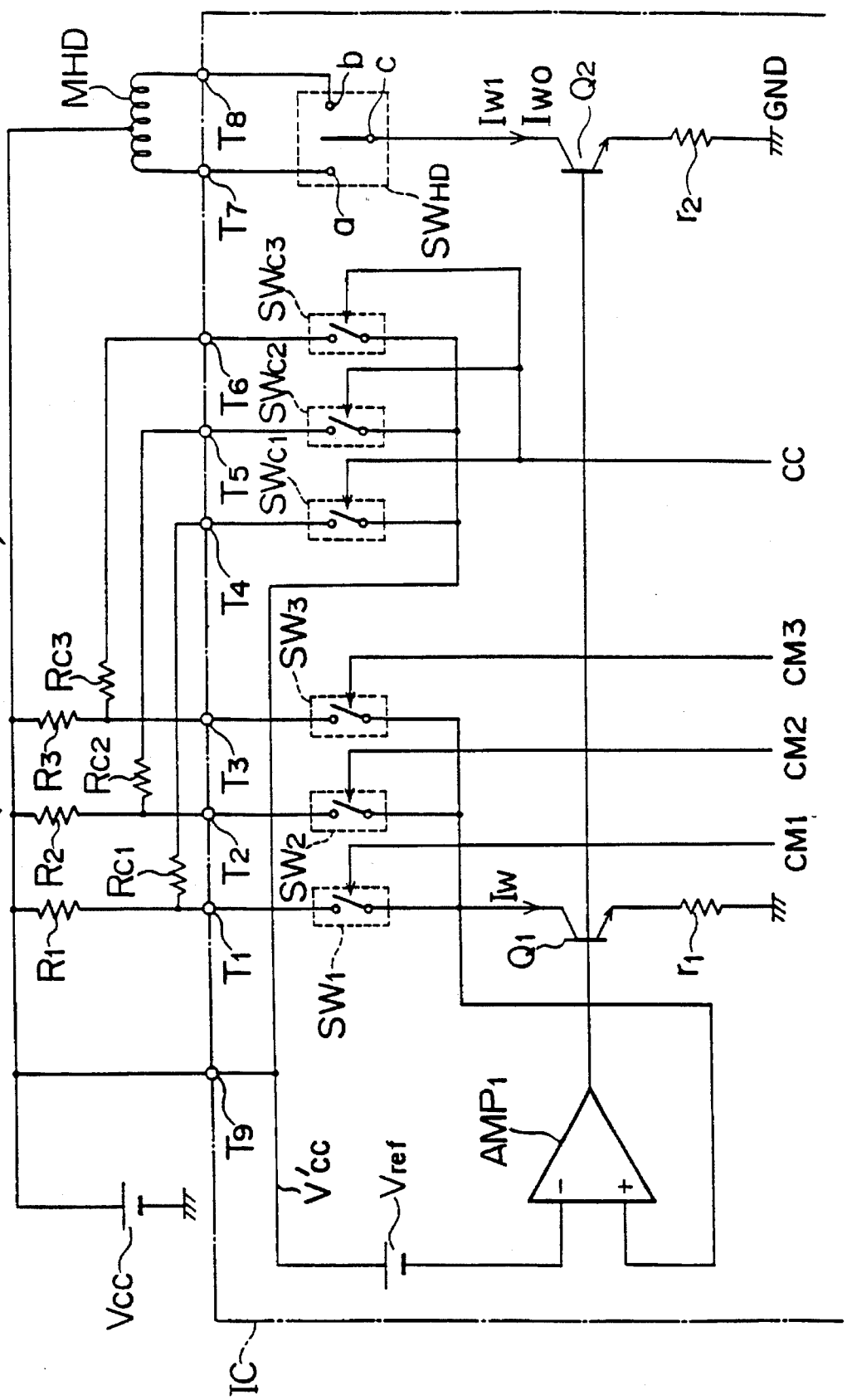
FIG. 1 is a circuit diagram of an example of a write current setting circuit of a conventional FDD.

Like with the configuration of FIG. 1, one end of the resistance elements $R_{C11}$ is connected to a connection point between the external resistance element $R_{11}$ and the IC pin $T_{11}$, one end of the resistance element $R_{C12}$ is connected to a connection point between the resistance element $R_2$ and the IC pin $T_{12}$, and one end of the resistance element $R_{C13}$ is connected to a connection point between the external resistance element $R_{13}$ and the IC pin $T_{13}$.

Inside the integrated circuit IC, the IC pin $T_{14}$ is connected to the terminal g of the sub-mode switch circuit SWC.

The contact terminal of the switch circuit $SWC_1$ is connected to a connection point between the internal power source line $V'_{cc}$ and the IC pin $T_9$, while the contact terminal f is connected to the output terminal and the non-inverted input terminal of the amplifier $AMP_1$ serving as the reference voltage holding circuit.

The non-inverted input terminal of the amplifier $AMP_{12}$ is connected to a connection point between the inverted input terminal of the amplifier $AMP_{11}$ and the internal reference power source $V_{ref1}$.

It may be noted that the amplifier $AMP_{12}$ forms a voltage follower circuit.

The sub-mode switch circuit $SWC_1$ connects the terminal g and the terminal f when the correction current control signal $CC_1$ is nonactive and connects the terminal g and the terminal e when the correction current control signal $CC_1$ is active.

Next, the operation of the above structure will be explained taking as an example the case of writing data at the inner and outer circumferences of the disk in the 1 MB mode mode.

When writing data at the inner circumference side of the disk in the 1 MB mode, only the main mode control signal $CM_{11}$ out of the main mode control signals $CM_{12}$ to $CM_{13}$ is active and is input to the switch circuit $SW_{11}$. Due to this, the switch circuit is held in the ON state and the switch circuits $SW_{12}$ and $SW_{13}$ are held in the OFF state.

When writing data at the inner circumference side of the disk, avoidance of interference between adjoining data requires writing by a current smaller than that at the outer circumference side, so no sub-mode current correction is performed. Consequently, the correction current control signal $CC_1$ is input to the sub-mode switch circuit $SWC_1$ in the nonactive state. Due to this, the terminal g and the terminal f are connected in the switch circuit $SWC_1$. That is, the IC pin $T_{14}$, and the output terminal of the amplifier $AMP_{12}$ are connected.

As a result, the IC pin $T_{14}$, becomes the internal reference voltage $V_{REF1}$ and the two ends of the external resistance element $R_{C11}$ become the same level, so the generation of current by the resistance element $R_{C11}$ is suppressed and the write current $I'_{W1}$ at that time is given by the following equation:

$$I'_{W1} = (V_{REF1}/R_{1V}) + \{(V_{REF1} - V_{REF1})/R_{1V}\}$$
$$= (V_{REF1}/R_{1V})$$

Note that at this time, current flows to the amplifier $AMP_{12}$ by the route of the external resistance elements $R_{12}-R_{C12}$ and $R_{13}-R_{C13}$ at the outside of the IC, but the output impedance of the amplifier $AMP_{12}$ formed as a voltage follower is sufficiently low, so becomes the voltage of $V_{REF1}$ and the above-mentioned equation is thus derived.

On the other hand, in the 1 MB mode, when writing data at the outer circumference side of the disk, there is little danger of interference between data even if writing deeply, so the correction current $I_{WC}$ is added to the write current $I_{WI}$ at the time of writing at the inner circumference side mentioned above and therefore data is written by a current larger than the write current at the inner circumference side.

That is, a correction current control signal $CC_1$ is input to the sub-mode switch circuit $SWC_1$ in the active state, the terminal g and the terminal e are connected in the switch circuit $SWC_1$, and the IC pin $T_{14}$ is connected to the internal power source line $V'_{cc}$.

As a result, the internal reference voltage $V_{REF1}$ is applied not only to the external resistance element $R_{11}$, but also the resistance element $R_{C11}$, and the write current $I'_{WO}$ at this time becomes the combined current of the current due to the resistance element $R_{11}$ and the current due to the resistance element $R_{C11}$ as shown in the following equation:

$$I'_{WO}=(V_{REF1}/R_{11V})+\{(V_{REF1})/R_{C11V}\}$$

The above operation is similarly performed in the 2 MB mode and the 4 MB mode.

As explained above, according to the present invention, the external resistance elements $R_{C11}$ to $R_{13}$ for generating the sub-mode correction current are connected to a single IC pin $T_{14}$, the integrated circuit IC is provided inside it with the amplifier $AMP_{12}$ for holding the output voltage to the voltage $V_{REF1}$ in the same way as the amplifier $AMP_{11}$, and provision is made of the sub-mode switch circuit $SWC_1$ for switching the connection between the IC pin $T_{14}$ and the internal power source line $V'_{cc}$ and the amplifier $AMP_{12}$, so six external resistance elements $R_{11}$ to $R_{13}$ and $R_{C11}$ to $R_{C13}$ are required, but it is possible to set six modes with four IC pins $T_{11}$ to $T_{14}$ of the integrated circuit IC.

Therefore, assuming the same number of modes, the number of pins of the IC package can be slashed compared with the prior art circuits.

Note that the number of main modes and the number of sub-modes, needless to say, are not limited to those in the present embodiment. Further, when the number of main modes increases, if the number of the main modes is M and the number of correction sub-modes in each mode is C, the number of IC pins becomes (M+C), so the number of pins can be slashed compared with the (M×C) of the prior art circuits.

As explained above, according to the present invention, since, if the number of the main modes is M and the number of correction sub-modes in each mode is C, the number of terminals of the integrated circuit becomes (M+C), the number of terminals can be slashed compared with the (M×C) of the prior art circuits, the increase in the number of terminals accompanying an increase in the number of modes can be held to a minimum, and therefore an increase in size of the package can be prevented.

What is claimed is:

1. A current setting circuit having a plurality of main modes and at least one sub-mode for correction of the main modes, switching connections between an internal power source line provided in an integrated circuit, and a plurality of resistance elements so as to define write current in accordance with individual modes, said current setting circuit comprising:

a reference power source;

a plurality of main mode terminals provided in said integrated circuit corresponding to said main modes;

a single sub-mode terminal provided in said integrated circuit;

a plurality of main mode resistance elements, one terminal of each of which is connected to a said main mode terminal, and the other terminal of which is connected to said reference power source;

a plurality of sub-mode resistance elements connected between connection points between said main mode terminals and said one terminals of said main mode resistance elements, and said sub-mode terminal;

a main mode switch circuit comprising a plurality of main mode switches and selectively switching said connection of said reference power source with said main mode resistance elements in accordance with an input of one of main mode control signals, a reference voltage level holding circuit for holding the output at a reference voltage level of said first reference power source; and a single sub-mode switch circuit for selectively switching the connection of the sub-mode terminal between said first power source line and said output terminal of said reference voltage level holding circuit in accordance with the input of said sub-mode control signal, to thereby output a current depending on said main mode and said sub-mode through said main mode switch circuit.

2. A current setting circuit as set forth in claim 1, wherein said reference voltage level holding circuit comprises a voltage follower circuit.

3. A current setting circuit as set forth in claim 1, wherein said plurality of main mode resistance elements and said plurality of sub-mode resistance elements are external to said integrated circuit.

4. A magnetic recording apparatus provided with a current setting circuit for supplying a write current to a magnetic head, wherein said current setting circuit has a plurality of main modes, at least one sub-mode for correction of the main modes, and switching connections between an internal power source line provided in an integrated circuit and a plurality of resistance elements so as to define the write current in accordance with individual modes, said current setting circuit comprising:

a reference power source;

a plurality of main mode terminals provided in said integrated circuit corresponding to said main modes;

a single sub-mode terminal provided in said integrated circuit;

a plurality of main mode resistance elements, one terminal of each of which is connected to a said main mode terminal, and the other terminal of which is connected to said reference power source;

a plurality of sub-mode resistance elements connected between connection points between said main mode terminals and said one terminals of said main mode resistance elements, and said sub-mode terminal;

a main mode switch circuit comprising a plurality of main mode switches and selectively switching said connection of said reference power source with said main mode resistance elements in accordance with an input of one of main mode control signals, a reference voltage level holding circuit for holding the output at a reference voltage level of said first reference power source; and a single sub-mode switch circuit for selectively switching the connection of the sub-mode terminal between said first power source line and said output terminal of said reference voltage level holding circuit in accordance with the input of said sub-mode control signal, to thereby output the write current depending on said main mode and said sub-mode through said main mode switch circuit, wherein the write current is supplied to said magnetic head through said main mode switch circuit.

5. A magnetic recording apparatus provided with a current setting circuit for supplying a write current to a magnetic head in a magnetic recording apparatus, said current setting circuit having a plurality of main modes, at least one sub-mode for correction of the main modes and switching connections between an internal power source line provided in an integrated circuit, and a plurality of resistance elements so as to define the write current in accordance with the individual modes, said current setting circuit comprising:

a reference power source;

a plurality of main mode terminals provided in said integrated circuit corresponding to said main modes;

a single sub-mode terminal provided in said integrated circuit;

a plurality of main mode resistance elements, one terminal of each of which is connected to a said main mode terminal, and the other terminal of which is connected to said reference power source;

a plurality of sub-mode resistance elements connected between connection points between said main mode terminals and said one terminals of said main mode resistance elements, and said sub-mode terminal, said plurality of main mode resistance elements and said plurality of sub-mode resistance elements are provided outside of said integrated circuit;

a main mode switch circuit comprising a plurality of main mode switches and selectively switching said connection of said reference power source with said main mode resistance elements in accordance with an input of one of main mode control signals, a reference voltage level holding circuit, comprising a voltage follower circuit, for holding the output at a reference voltage level of said first reference power source; and a single sub-mode switch circuit for selectively switching the connection of the sub-mode terminal between said first power source line and said output terminal of said reference voltage level holding circuit in accordance with the input of said sub-mode control signal, to thereby output a current depending on said main mode and said sub-mode through said main mode switch circuit, wherein said magnetic recording apparatus comprises a rotatable recording media on which data are stored by said magnetic head, and wherein said current setting circuit provides said write current depending on said main mode and said sub-mode to said magnetic head.

6. A magnetic recording apparatus according to claim 5, wherein when said data is stored at an outer circumference of said recording media, one of said main mode switches and said sub-mode switch circuit are energized to provide a large current to said magnetic head, and wherein when said data is stored at an inner circumference of said media, one of said main mode switches is energized and said sub-mode switch is deenergized to provide a small current to said magnetic head.

7. An integrated circuit chip including a circuit for providing a current to a magnetic head by which data is stored on a rotatable recording media, in response to main modes defining a media capacity and a sub-mode defining a storage region of an outer circumference and inner circumference of said recording media, said IC chip comprising:

a plurality of main mode terminals, the number of said main mode terminals being defined by the number of said main modes;

a single sub-mode terminal;

a voltage source;

a plurality of main mode switches, one end of each of which being connected to a said main mode terminal and the other ends being commonly connected;

a single sub-mode switch having a common contact connected to said sub-mode terminal, a first contact connected to said voltage source, and a second contact;

a voltage follower circuit, an input being connected to said voltage source and output being connected to said second contact of said sub-mode switch; and a current generation circuit, an input being connected to a common connected point of said main mode switches and an output being connected to said magnetic head, said main mode terminals being supplied with main mode voltages depending on said main modes, said sub-mode terminal being supplied with a sub-mode voltage defined by a selected main mode and added to the main mode voltage, one of said main mode switches being energized by a main mode signal, and said sub-mode terminal being energized to connect said common contact and said first contact when the sub-mode is selected, and deenergized to connect said common contact and said second contact when the sub-mode is not selected.

* * * * *